May 21, 1929. T. S. RAMSDELL 1,714,105
AUTOMATIC OVERLOAD CONTROL DEVICE
Filed June 14, 1927
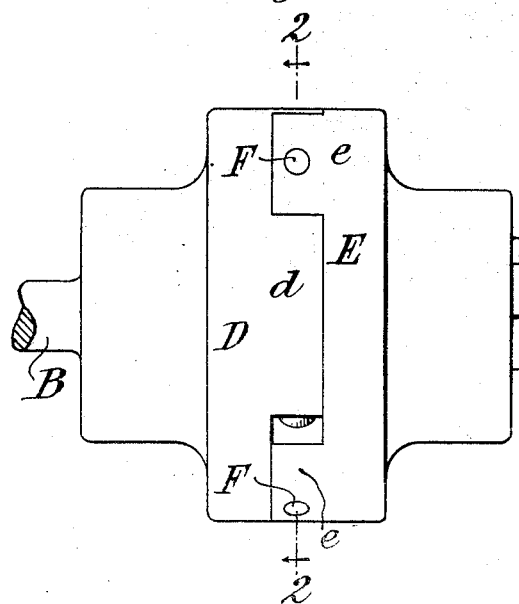
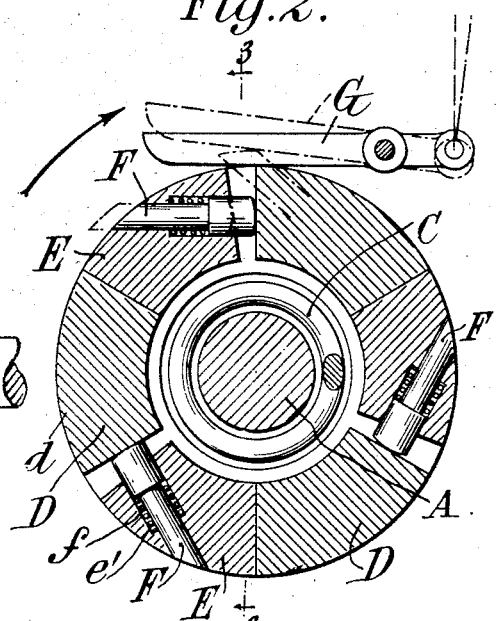
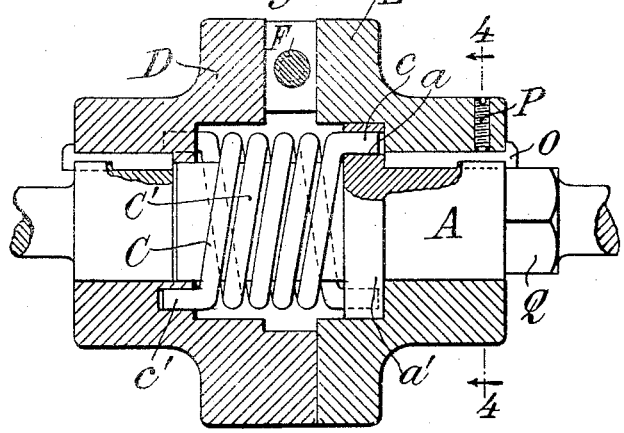
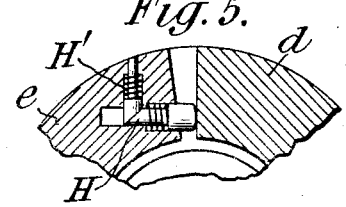
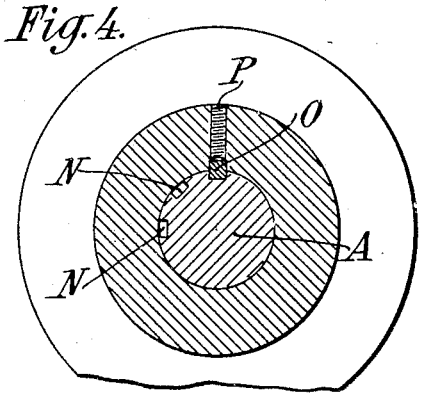
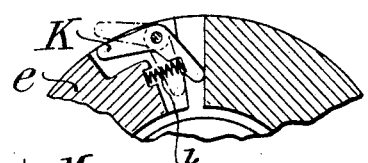
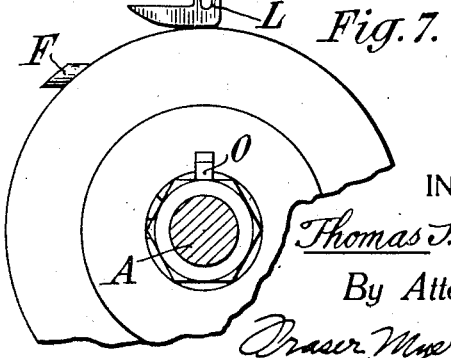
INVENTOR:
Thomas S. Ramsdell,
By Attorneys,
Fraser, Myers & Manley.

Patented May 21, 1929.

1,714,105

UNITED STATES PATENT OFFICE.

THOMAS S. RAMSDELL, OF GREAT BARRINGTON, MASSACHUSETTS.

AUTOMATIC OVERLOAD-CONTROL DEVICE.

Application filed June 14, 1927. Serial No. 198,860.

This invention relates to automatic overload control devices, and more particularly to a device adapted to operate a mechanism for throwing out of operation a machine when it is subjected to an abnormal strain or overload, and thereby prevent injury being done to said machine.

According to the present invention the automatic overload control device consists of a driving shaft, a driven shaft, a torsion spring through which rotation is transmitted from one shaft to the other, said torsion spring being capable of transmitting rotatable energy sufficient to overcome the maximum allowable torque on the driven shaft without producing relative rotation between said shafts, and means such as a pawl carried by the device, adapted, upon relative rotation being produced between the shafts due to a strain or overload on the driven shaft which tends to hold it stationary or slow it down, to be moved to engage and operate a mechanism for stopping rotation of the driving shaft. Such mechanism may be operated either through the shutting off of the power, the shifting of the driving belt from the driving pulley to a loose pulley or in any other well known manner. Preferably, the torsion drive is made adjustable so that the device may be adjusted to various maximum allowable torques at which the device is desired to operate.

A preferred embodiment of my invention is illustrated in the accompanying drawings, wherein—

Figure 1 is an elevation of the device embodying my invention.

Fig. 2 is a section taken on the line 2—2 of Fig. 1, with parts thereof shown in elevation.

Fig. 3 is an axial section of the device with parts shown in elevation.

Fig. 4 is a section taken along the line 4—4 of Fig. 3.

Figs. 5 and 6 are fractional transverse sections corresponding to Fig. 2, showing slight modifications of the invention.

Fig. 7 is an end elevation of still another modified form of the invention.

Referring to the drawings, where the same reference characters designate the corresponding parts in the various figures, let A indicate a driving shaft, B a driven shaft and C and C' duplex or nested torsion springs connected to said shafts and adapted to transmit rotation from one to the other. The shafts A and B are preferably mounted in axial alignment with their adjacent ends in substantially abutting relation and with the springs C and C' encircling the end of one of the shafts and having their ends anchored either directly in said shafts or in elements fixedly carried by said shafts. As herein shown, one end $c$ of the spring C is anchored in an opening $a$ provided in a flange $a'$ formed on the shaft A, while the opposite end $c'$ of said spring is anchored in an opening provided in a clutch-like element D keyed upon the shaft B. The ends of the spring C' are likewise anchored in said members, as indicated in dotted lines.

Mounted on the adjacent ends of the shafts A and B are complemental clutch-like elements E and D respectively provided with interengaging jaws $d$ and $e$ adapted for limited relative circumferential movement. The jaws $e$ are each formed with a recess $e'$ which extends from one wall of the jaw to the outer circumferential periphery thereof, and in each of said recesses $e'$ there is mounted a pawl F normally acted upon by a spring $f$ tending to hold said pawl in its innermost position, that is to say, with its outer end housed within the circumferential periphery of the jaw $e$. The pawl F in this position has its opposite end pressed against the side wall of the adjacent jaw $d$ of the complemental clutch-like element, as best shown in Fig. 2. From said showing in Fig. 2 it will be apparent that upon any relative circumferential movement taking place between the clutch-like elements D and E, the pawls F will be projected beyond the circumference of the jaws $e$, as shown in dotted lines at the top of said Fig., which pawls when so projected are designed to engage a lever G constituting an element of a mechanism (not shown) for stopping rotation of the driving shaft, which mechanism may be of any desired or approved form.

In Fig. 5, instead of a single pawl mounted within each of the jaws $e$ of the clutch-like element E, I have shown a pair of co-operating spring-pressed pawls H and H' mounted in recesses disposed at right angles to each other, the adjacent ends of the pawls being beveled so that upon relative circumferential movement between the jaws $d$ and

*e*, movement of the pawl H will be communicated to pawl H′ to project the latter substantially radially outward.

In Fig. 6 I have shown a central pivoted annular pawl K mounted within the jaw *e* in such manner that upon relative movement of the clutch-like elements, the inner end of the pawls will be moved about its pivot against the action of a spring *k* to move the outer end of the pawls beyond the periphery of the jaw.

In Figs. 2, 5 and 6, the pawls are shown as adapted to engage a lever, which, in turn, operates a mechanism for stopping rotation of the driving shaft. If desired, movement of the lever by the pawls can be made to operate an electric circuit, and in turn, electrical means for stopping motion of the driving shaft. In Fig. 7 I have shown such electrically-controlled means which consists of a shoe-like element L having elongated opening *l* adapted to permit the shoe to ride over a pin *l′* when engaged by a pawl F. The raising of the shoe L is adapted to move a switch M to close an electric circuit, which, in turn, will operate the mechanism for stopping rotation of the driving shaft.

The springs C and C′, it will be apparent, must be of such strength as to be capable of transmitting rotatable energy from the driving shaft A to the driven shaft B sufficient to overcome the maximum allowable torque of the driven shaft without producing any relative rotation between the shafts, and it will be obvious that if desired or found expedient, a single torsion spring may be employed. Upon an excess of torque on the driven shaft being encountered due to any cause whatever, it will be apparent that relative rotation will be produced between the clutch-like elements D and E with the result that the pawls F will be moved beyond the circumferential periphery of said clutch-like elements to operate a mechanism for stopping rotation of the driving shaft and thus avoid injury being done to the machine.

In order that the springs C and C′ may be capable of use where it is not desired to operate a machine at all times under a predetermined constant maximum torque, I have devised a means for varying the torsion of said springs. This means consists in providing the shaft A with a plurality of circumferentially-spaced axial grooves or keyways N adapted to accommodate the key O for securing the clutch-like element E upon the shaft A at different angular positions about the shaft. It will be apparent that if it is desired to vary the torsion on the springs, the key O will be withdrawn and the shaft A carrying the ends of the springs will be rotated until the desired torsion on said springs is obtained and the key O inserted in the keyway N, which then comes into alignment with the keyway in the clutch element E. To facilitate the turning of the shaft carrying the spring ends, said shaft may be provided with wrench-engaging faces such as Q.

From the foregoing description it will be apparent that I have provided a simple and effective power stop-control device which may be attached as a supplemental mechanism to existing machines, or such as may be incorporated in new machines. The device is extremely simple in construction and efficient in operation, since it will be apparent that upon the maximum torque being exceeded, the pawls are certain of operation to engage and operate the stop motion mechanism.

While I have shown and described a preferred embodiment of my invention I do not wish to be limited to the details of construction set forth, since various modifications thereof may be resorted to without departing from the spirit of my invention, as set forth in the accompanying claims.

What I claim is:

1. An automatic overload control device comprising a driving shaft, a driven shaft, a torsion spring through which rotation is transmitted from one shaft to the other, said spring being capable of transmitting rotatable energy sufficient to overcome the maximum allowable torque, without producing any relative rotation between the shafts, and movable means carried by one of said shafts and movable by the other shaft to operate a mechanism for stopping rotation of the driving shaft, said means being movable to operative position by the relative rotation of the shafts.

2. An automatic overload control device comprising a driving shaft, a driven shaft, a torsion spring through which rotation is transmitted from one shaft to the other, said spring being capable of transmitting rotatable energy sufficient to overcome the maximum allowable torque, without producing any relative rotation between the shafts, means for variably adjusting the effective maximum torsion of the spring, and movable means carried by one of said shafts and movable by the other shaft to operate a mechanism for stopping rotation of the driving shaft, said means being movable to operative position by the relative rotation of the shafts.

3. An automatic overload control device comprising a driving shaft, a driven shaft, a torsion spring through which rotation is transmitted from one shaft to the other, said spring being capable of transmitting rotatable energy sufficient to overcome the maximum allowable torque, without producing any relative rotation between the shafts, and a pawl carried by one of said shafts and movable by the other shaft to operate a mechanism for stopping rotation of the driving shaft, said pawl being movable to operative position by the relative rotation of the shafts.

4. An automatic overload control device comprising a driving shaft, a driven shaft, a torsion spring through which rotation is transmitted from one shaft to the other, said shafts being capable of limited relative circumferential movement when the driven shaft is subjected to overload, and means carried by said shafts adapted to operate a mechanism for stopping rotation of the driving shaft, said last-named means being movable to operative position by the relative circumferential movement of the shafts.

5. An automatic overload control device comprising a driving shaft, a driven shaft in alignment therewith, a torsion spring connected to said shafts adapted to transmit rotation from one shaft to the other, complemental clutch-like elements carried by said shafts, and adapted for limited relative rotation when one of said shafts is subjected to a strain or overload, and a pawl carried by and normally lying within the contour of one of the clutch-like elements, movable beyond said contour by the complemental clutch-like element when said complemental elements rotate relatively to each other.

6. An automatic overload control device comprising a driving shaft, a driven shaft in alignment therewith, a torsion spring connected to said shafts adapted to transmit rotation from one shaft to the other, complemental clutch-like elements carried by said shafts, and adapted for limited relative rotation when one of said shafts is subjected to a strain or overload, and a spring-pressed pawl carried by and normally lying within the contour of one of the clutch-like elements and engaging the other clutch-like element, movable beyond the contour of said first-named clutch-like element by the complemental clutch-like element when said complemental elements rotate relatively to each other.

7. An automatic overload control device comprising a driving shaft, a driven shaft in alignment therewith, a torsion spring connected to said shafts adapted to transmit rotation from one shaft to the other, said spring being capable of transmitting rotatable energy sufficient to overcome the maximum allowable torque without producing any relative rotation between the shafts, complemental clutch-like elements carried by said shafts, and adapted for limited relative rotation when one of said shafts is subjected to a strain or overload, a pawl carried by and normally lying within the contour of one of the clutch-like elements, movable beyond said contour by the complemental clutch-like element when said complemental elements rotate relatively to each other, and an arm of a mechanism for stopping rotation of the driving shaft mounted in proximity to the contour of the clutch-like elements, the operation of said mechanism being effected by the engagement of said arm by said pawl.

8. An automatic overload control device comprising a driving shaft, a driven shaft in axial alignment therewith, complemental clutch-like elements fixed on the adjacent ends of said shafts, a torsion spring connected to said shafts adapted to transmit rotation from one shaft to the other, and means for variably adjusting the torsion of said spring, comprising a plurality of axial keyways on one of said shafts and on its clutch-like element and a key for splining said clutch-like element on said shaft at different angular positions about the shaft.

In witness whereof, I have hereunto signed my name.

THOMAS S. RAMSDELL.